(12) United States Patent
Ma et al.

(10) Patent No.: US 11,307,126 B2
(45) Date of Patent: Apr. 19, 2022

(54) EXPERIMENTAL DEVICE FOR CAVITATION CORROSION OF LIQUID METAL

(71) Applicants: XI'AN JIAOTONG UNIVERSITY, Shaanxi (CN); JIANGSU FEILU HEAVY INDUSTRY MACHINERY MANUFACTURING CO., LTD., Jiangsu (CN); Beijing University of Technology, Beijing (CN)

(72) Inventors: Shengqiang Ma, Shaanxi (CN); Jiaqi Wang, Shaanxi (CN); Ping Lv, Shaanxi (CN); Zongliang Zhang, Shaanxi (CN); Jiandong Xing, Shaanxi (CN); Hanguang Fu, Shaanxi (CN); Yimin Gao, Shaanxi (CN)

(73) Assignees: XI'AN JIAOTONG UNIVERSITY, Xi'an (CN); JIANGSU FEILU HEAVY INDUSTRY MACHINERY MANUFACTURING, Taizhou (CN); Beijing University of Technology, Beijing (CN)

( * ) Notice: Subject to any disclaimer, the term of this patent is extended or adjusted under 35 U.S.C. 154(b) by 218 days.

(21) Appl. No.: 16/741,945

(22) Filed: Jan. 14, 2020

(65) Prior Publication Data

US 2021/0033509 A1    Feb. 4, 2021

(51) Int. Cl.
*G01N 3/56* (2006.01)
*G01N 17/00* (2006.01)

(52) U.S. Cl.
CPC .......... *G01N 3/567* (2013.01); *G01N 17/006* (2013.01)

(58) Field of Classification Search
CPC ............................. G01N 3/567; G01N 17/006
See application file for complete search history.

(56) References Cited

U.S. PATENT DOCUMENTS

| 2016/0040936 | A1* | 2/2016 | Amusin | ................... F27D 99/00 266/233 |
| 2018/0119309 | A1* | 5/2018 | Jonczyk | .................. C30B 29/06 |
| 2018/0305120 | A1* | 10/2018 | Yang | ....................... B65F 1/163 |

FOREIGN PATENT DOCUMENTS

| CN | 85200621 U | * | 2/1986 |
| CN | 201749068 U | | 2/2011 |
| CN | 102331380 A | | 1/2012 |
| CN | 103323356 A | | 9/2013 |
| CN | 103454210 A | * | 12/2013 |

(Continued)

*Primary Examiner* — Herbert K Roberts
*Assistant Examiner* — Fatemeh Esfandiari Nia

(57) ABSTRACT

The present invention discloses an experimental device for cavitation corrosion of liquid metal, comprising a stand, and a vibration device and a lifting and rotating device separately arranged on the stand, wherein a heating device for experimental use is arranged on the vibration device; a furnace lid with a sealing ring is arranged above the heating device; a stirring mechanism is arranged on the furnace lid; the stirring mechanism is connected to a chunk below the furnace lid; a clamp is connected below the chuck, and the clamp is connected to a sample; the furnace lid is connected to the lifting and rotating device; the lifting and rotating device can control the movement of the furnace lid so that the sample is placed in the heating device; the lifting and rotating device, the stirring mechanism, the heating device and the vibration device are connected to a control system.

6 Claims, 6 Drawing Sheets

(56) References Cited

FOREIGN PATENT DOCUMENTS

| | | | | |
|---|---|---|---|---|
| CN | 103454210 | A | | 12/2013 |
| CN | 203405397 | U | | 1/2014 |
| CN | 103629122 | A | | 3/2014 |
| CN | 203858170 | U | | 10/2014 |
| CN | 203858170 | U | * | 10/2014 |
| CN | 206920266 | U | | 1/2018 |
| CN | 107884333 | A | * | 4/2018 |
| CN | 105510210 | B | | 8/2018 |
| EP | 2722662 | A1 | | 4/2014 |
| EP | 2937442 | A | | 10/2015 |
| JP | 2006082162 | A | * | 3/2006 |
| JP | 2017033846 | A | * | 2/2017 |

* cited by examiner (a) (b)

(a) (b)

EXPERIMENTAL DEVICE FOR CAVITATION CORROSION OF LIQUID METAL

TECHNICAL FIELD

The present invention belongs to the technical field of experimental devices for corrosion of liquid metal, and particularly relates to an experimental device for cavitation corrosion of liquid metal which can be used for studying erosive corrosion behaviors of materials at a high rotation speed, interaction between high-flow-rate fluid and the surface structure of the materials, cavitation corrosion mechanisms and the like.

BACKGROUND OF THE PRESENT INVENTION

Severe erosive corrosion of liquid zinc related to sink rollers, stabilizing rollers, bearings, sleeves or the like in the hot galvanizing lines will cause a huge economic loss. Statistically, in 2000, 57 production lines in the United States had a loss of 46 million U. S. dollars. In China, the galvanizing lines only in Bao steel had a loss of up to 80 million per year due to the corrosion to roller components. Therefore, experimental devices for studying corrosion of liquid metal are very important.

At present, there are two kinds of commercially available and commonly used experimental devices for corrosion of liquid metal, i.e., tubular devices by which liquid metal is driven, by heat convection or an external force, to flow in a tube to carry out corrosion experiments; and rotary devices by which a relative speed is formed between a sample and liquid metal by rotating the sample so as to carry out experiments for erosive corrosion of liquid metal. However, by the commercially available and commonly used experimental devices for corrosion of liquid metal, only static liquid metal corrosion or low-speed liquid metal erosive corrosion experiments can be simulated. In actual industrial applications, the flow rate of liquid metal is very high. Taking hot galvanizing as an example, the flow rate of liquid zinc is up to 15 inch/s, which is far higher than that in a simulation environment realized by using a common experimental device at present. Additionally, for the two kinds of commercially available experimental devices for corrosion of liquid metal, the following fact is not taken into accounted: during the erosion of liquid metal at a high flow rate, even if the liquid metal itself is relatively high in boiling point and it is less likely to cause cavitation, cavitation corrosion still occurs due to the entrainment of an external gas and turbulence. Therefore, in the existing experimental process, it is unable to effectively simulate the simultaneous occurrence of high-speed erosion and cavitation corrosion in the actual production in a factory. As a result, the experiments are quite different from the actual working condition.

SUMMARY OF THE PRESENT INVENTION

In view of the deficiencies in the prior art, a technical problem to be solved by the present invention is to provide an experimental device for cavitation corrosion of liquid metal, which can realize high-speed erosion and have a maximum rotation speed of 2000 r/min, can simulate the simultaneous occurrence of high-speed erosive corrosion and cavitation corrosion, and can effectively simulate working conditions during the actual hot galvanizing process. Moreover, in addition to high-speed erosive corrosion of liquid metal, the experimental device works well for static liquid metal corrosion as well as low-speed and medium-speed erosive corrosion of liquid metal.

The present invention employs the following technical solutions.

An experimental device for cavitation corrosion of liquid metal is provided, including a stand, and a vibration device and a lifting and rotating device separately arranged on the stand, wherein a heating device for experimental use is arranged on the vibration device; a furnace lid with a sealing ring is arranged above the heating device; a stirring mechanism is arranged on the furnace lid; the stirring mechanism is connected to a chunk below the furnace lid; a clamp is connected below the chuck, and the clamp is connected to a sample; the furnace lid is connected to the lifting and rotating device; the lifting and rotating device can control the movement of the furnace lid so that the sample is placed in the heating device; the lifting and rotating device, the stirring mechanism, the heating device and the vibration device are connected to a control system, respectively; and, an corrosion experiment is carried out by adjusting the temperature of the heating device.

Specifically, the heating device includes a heating furnace arranged on a high-frequency micro-vibration device, and a high-purity silicon nitride crucible used for receiving the sample is arranged inside the heating furnace.

Further, the crucible is of a cylindrical cavity structure; and, a lower end of the cavity is closed, and a sealed end cover with a central circular hole is provided at an upper end thereof.

Further, an infrared temperature detector connected to the control system is arranged on the furnace lid.

Specifically, the lifting and rotating device includes a guide pillar, one end of which is connected to the stand through a guide pillar stand while the other end of which is connected to the furnace lid through a guide sleeve; a speed reducer holder is arranged an extended end of the guide pillar; a speed reducer is arranged on the speed reducer holder; and, the speed reducer is connected to one end of a lead screw, and the other end of the lead screw runs through a nut on the furnace lid.

Further, the speed reducer is connected to the control system, and the speed reducer is connected with a hand wheel.

Specifically, the stirring mechanism includes a stirring motor and a sample rack; the stirring motor is connected to one end of a stirring shaft through a coupler; the other end of the stirring shaft runs through the furnace lid to be connected to the sample rack; and, the sample is arranged on the sample rack through the clamp.

Further, a motor holder is arranged on an upper side of the furnace lid; the stirring motor is arranged on the motor holder; the sample rack is arranged on a lower side of the furnace lid; and, three slots are formed at clamping positions of the sample rack. Specifically, the vibration device includes a vibration platform; the vibration platform is arranged on the stand; a vibrator is arranged below the vibration platform; and, the heating furnace of the heating device is arranged on the vibration platform. Specifically, an air damper is arranged between the vibration platform and the stand. Compared with the prior art, the present invention has at least the following beneficial effects.

In the experimental device for cavitation corrosion of liquid metal provided by the present invention, by the heating device, the simulation of an actual working condition can be perfectly realized; by the stirring mechanism, experiments with different speed requirements can be carried out; and, by the vibration device, the simulation of cavitation corrosion can be realized, so that the experimental results are more reliable. By the high-speed rotation device and the intermittent high-frequency micro-vibration system, the cavitation corrosion in high-flow-rate liquid metal and the damage separation and interaction thereof can be realized accurately and stably. Further, by heating by the heating furnace, the temperature range is adjustable and flexible, and the maximum temperature can reach 800° C.; and by adjusting the rotation speed of the motor, multi-level control to the speed can be realized, and the maximum rotation speed can reach 2000 r/min.

Further, the infrared temperature detector can reflect the temperature in the furnace in real time and realize real-time monitoring.

Further, due to the straight-up and straight-down structure of the lifting and rotating device, it is convenient to ensure that the rotating shaft and the crucible are axially symmetrical, and the sample will not come into contact with the crucible during experiments. Meanwhile, the direct contact of a person with a high-temperature component is avoided, thereby ensuring the safety.

Further, the workpiece can be quickly clamped by the hand wheel, and the clamp structure and the sample shape are flexible, so that cavitation corrosion on the surface of the sample at different angles is realized.

Further, in the stirring mechanism, the motor is fixed by the motor holder, ensuring stable operation of the motor. The motor is connected to the stirring shaft by the coupler. It is convenient to replace the stirring shaft that is out of operation with a new one.

Further, three slots are formed at clamping positions of the sample rack. The erosion to the sample from different angles can be realized.

Further, the air damper can ensure that the whole device will be kept stable under heavy vibration, and the stand will not be displaced, and no damage to the floor will be caused.

In conclusion, in the experimental device of the present invention, the temperature in the furnace is controllable and adjustable and can be monitored in real time so that experimental data is more reliable. The stirring speed is adjustable within a wide range. The working condition under an extreme working condition of high rotation speed can be simulated. By the lifting and rotating device, the hand wheel and the stirring device together, the operation process is mechanized, and the direct contact of a person with a high-temperature component is avoided, thereby ensuring the safety. Finally, due to the arrangement of the air damper, during the cavitation corrosion experiment by using the vibration device, the whole experimental device is kept stable, and the stand is not displaced or inclined. In this way, the safety is ensured, and no damage to the ground is caused. Moreover, the greatest innovation of the device of the present invention lies in that the intensity of cavitation and corrosion is effectively adjusted and controlled by designing a cavitation/corrosion intermittent process distribution experiment under atmosphere protection, so that the damage separation of cavitation and corrosion is realized.

The technical solutions of the present invention will be further described below in detail by embodiments with reference to the accompanying drawings.

Figure 1:
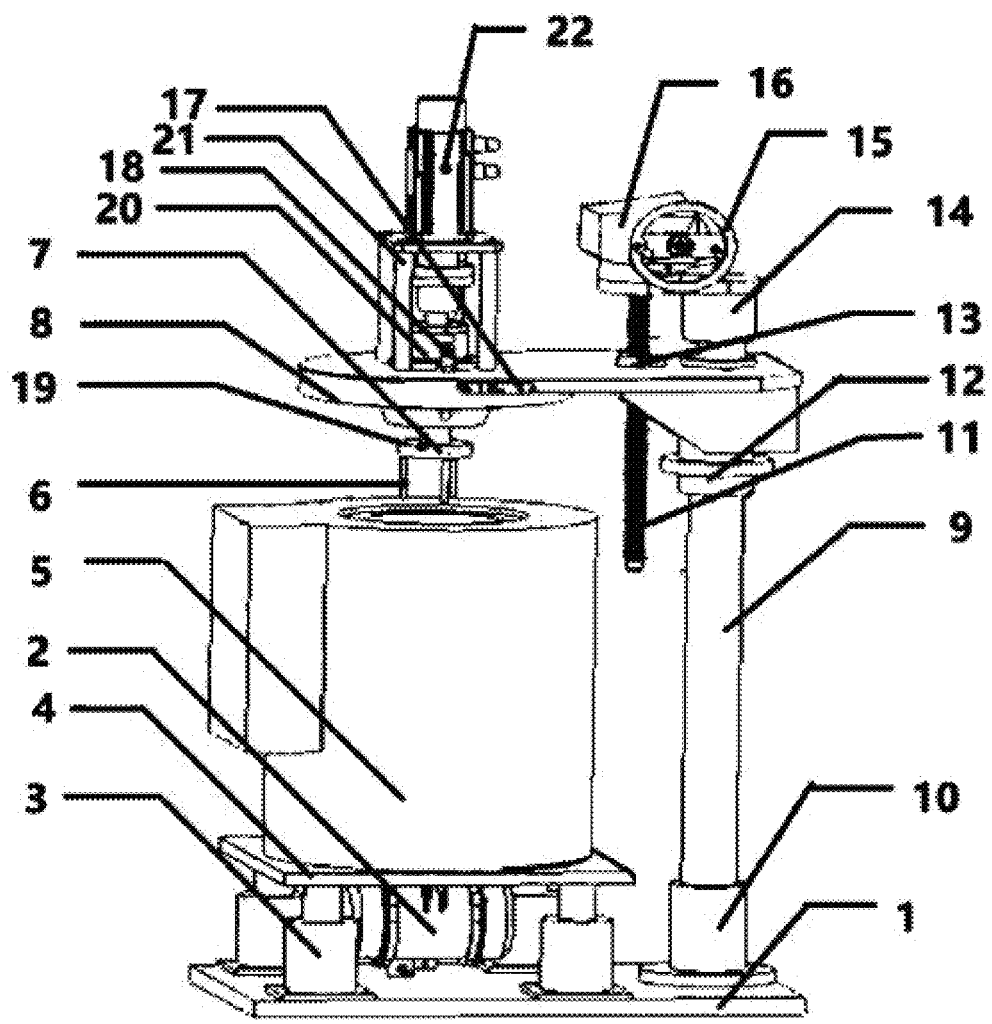
FIG. 1 is a general assembly diagram of an experimental device for corrosion of liquid metal.

REFERENCE NUMERALS in which: 1: stand; 2: vibrator; 3: air damper; 4: vibration platform; 5: heating furnace; 6: sample; 7: sample rack; 8: furnace lid; 9: guide pillar; 10: guide pillar stand; 11: lead screw; 12: guide sleeve; 13: nut; 14: speed reducer holder; 15: hand wheel; 16: speed reducer; 17: push-pull handle; 18: infrared temperature detector; 19: clamp; 20: coupler; 21: motor holder; and, 22: stirring motor; 30: lifting and rotating device.

DETAILED DESCRIPTION OF THE PRESENT INVENTION

It is to be understood that, in the description of the present invention, the orientation or positional relation indicated by terms "center", "longitudinal", "transverse", "upper", "lower", "front", "rear", "left", "right", "vertical", "horizontal", "top", "bottom", "inner", "outer" "one side", "one end", "one edge" or the like is an orientation or positional relation shown based on the accompanying drawings, merely for describing the present invention and simplifying the description rather than indicating or implying that the specified device or element must have a particular orientation or must be constructed and operated in a particular orientation. Therefore, the terms should not be interpreted as any limitations to the present invention. Unless otherwise specified, in the description of the present invention, "a plurality of" means two or more.

It is to be noted that, unless otherwise expressly specified and defined, in the description of the present invention, the terms "mount", "connect" and "connection" should be interpreted in a broad sense. For example, the connection may be fixed connection, detachable connection or integral connection; or, may be mechanical connection or electrical connection; or, may be direct connection or indirect connection with an intermediate medium interposed therebetween; or, may be internal communication between two elements. For a person of ordinary skill in the art, the specific meanings of the terms in the present invention can be interpreted according to specific situations.

The present invention provides an experimental device for cavitation corrosion of liquid metal. Corrosion of liquid metal is simulated by the experimental device after it is assembled well. By the simulation of corrosion of liquid metal by using the experimental device, the corrosion resistance and mechanical properties of a material under the synergetic effects of liquid metal corrosion, mechanical erosion and cavitation corrosion can be tested.

Figure 2:
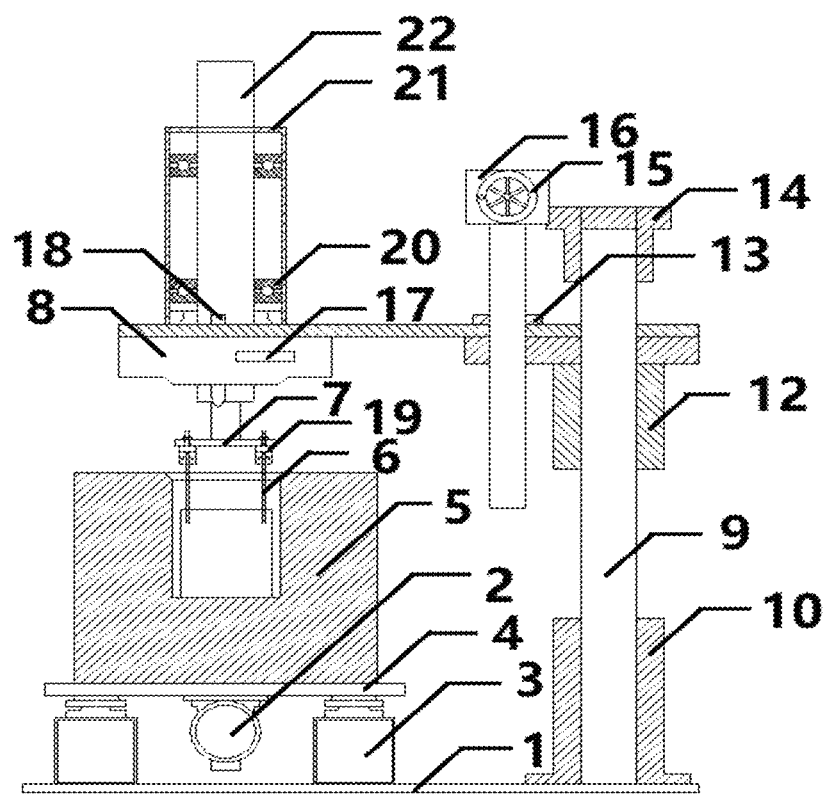
FIG. 2 is a sectional view of the experimental device for corrosion of liquid metal.

Referring to FIGS. 1 and 2, the experimental device for cavitation corrosion of liquid metal in the present invention includes a lifting and rotating device, a stirring mechanism, a heating device, a vibration device and a control system. The lifting and rotating device and the vibration device are arranged on a stand 1. The heating device is arranged on the vibration device. The stirring device is arranged on a furnace lid 8 of the heating device, and connected to the lifting and rotating device through the furnace lid 8. The vibration device is used for causing cavitation corrosion to the heating device, and the stirring mechanism is used for causing high-speed erosion to the heating device. The control system is connected to the lifting and rotating device, the stirring mechanism, the heating device and the vibration device, respectively. By adjusting the temperature of the heating device, the corrosion temperature is controllable and adjustable.

Figure 3:
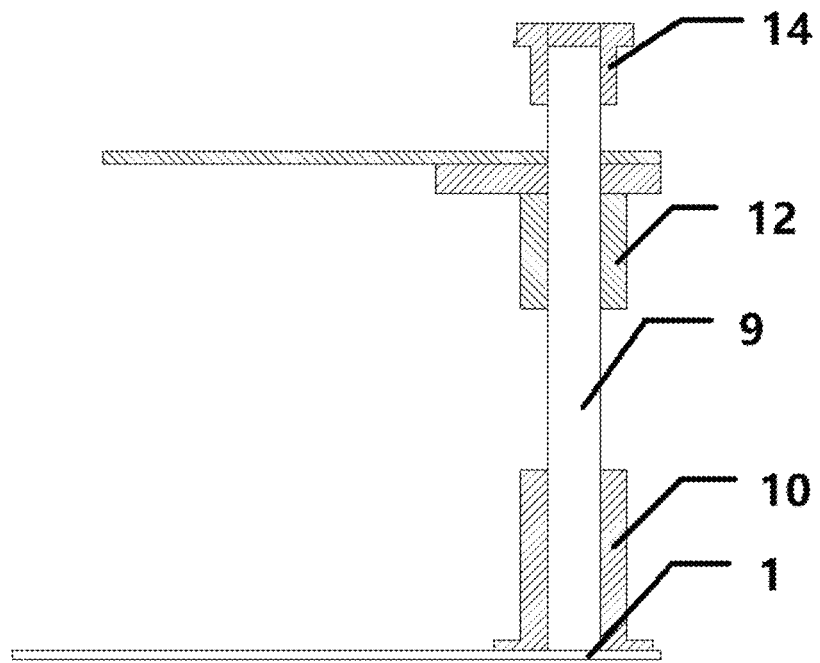
FIG. 3 is a schematic view of a frame of the experimental device for corrosion of liquid metal.
Figure 4:
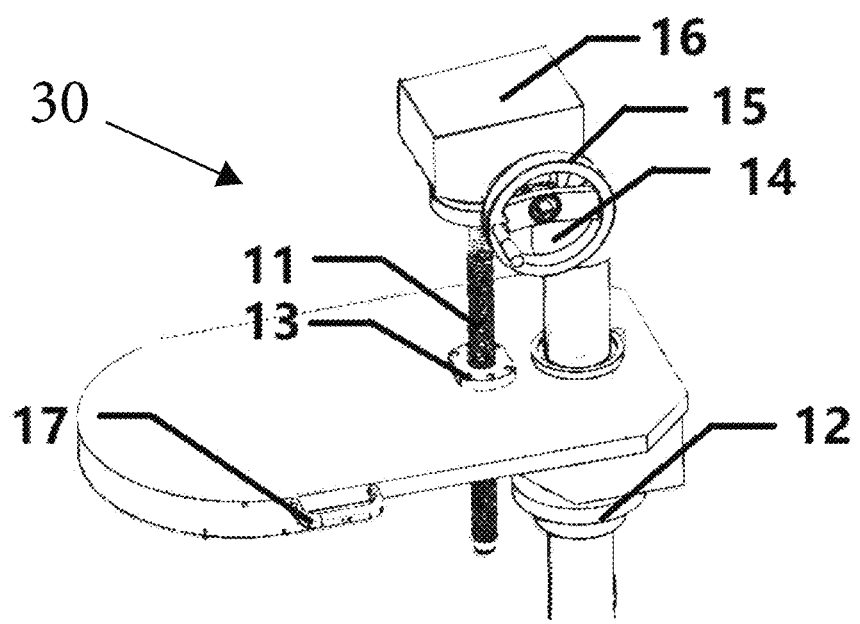
FIG. 4 is a schematic view of a lifting and rotating mechanism of the experimental device for corrosion of liquid metal.

Referring to FIGS. 3 and 4, the lifting and rotating device 30 includes a guide pillar 9, a guide pillar stand 10, a lead screw 11, a guide sleeve 12, a speed reducer holder 14, a speed reducer 16 and a push-pull handle 17. One end of the guide pillar 9 is connected to the stand 1 through the guide pillar stand 10, while the other end thereof runs through the furnace lid 8 through the guide sleeve 12 to be connected to the speed reducer holder 14 arranged on the furnace lid 8. The speed reducer 16 is arranged on the speed reducer holder 14. A nut 13 is arranged on the furnace lid 8. An output end of the speed reducer 16 is connected to one end of the lead screw 11, and the other end of the lead screw 11 runs through the nut 13. The furnace lid 8 is controlled to lift up or down through the lead screw and the nut. A hand wheel 15 is further arranged on the speed reducer 16.

Figure 7:
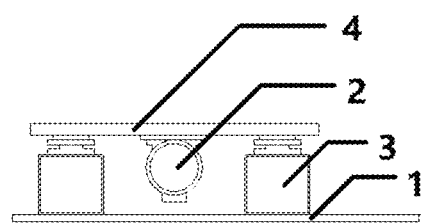
FIG. 7 is a schematic view of a vibration platform in the experimental device for corrosion of liquid metal.

Referring to FIG. 7, the vibration device includes a vibrator 2, an air damper 3 and a vibration platform 4. The heating furnace 5 is arranged on the vibration platform 4, and the vibration platform 4 is connected to the heating furnace 5 through a screw and a nut. The vibrator 2 is mounted below the vibration platform 4 through a screw and a nut. The air damper 3 is arranged around the vibrator 2, has an end connected to the vibration platform 4 and another end connected to the stand 1, and is used for damping and maintaining the stability of the whole device and preventing from rollover. Through the vibration of the vibrator 2, bubbles can be formed in the heating furnace 5 to simulate cavitation corrosion.

Figure 5:
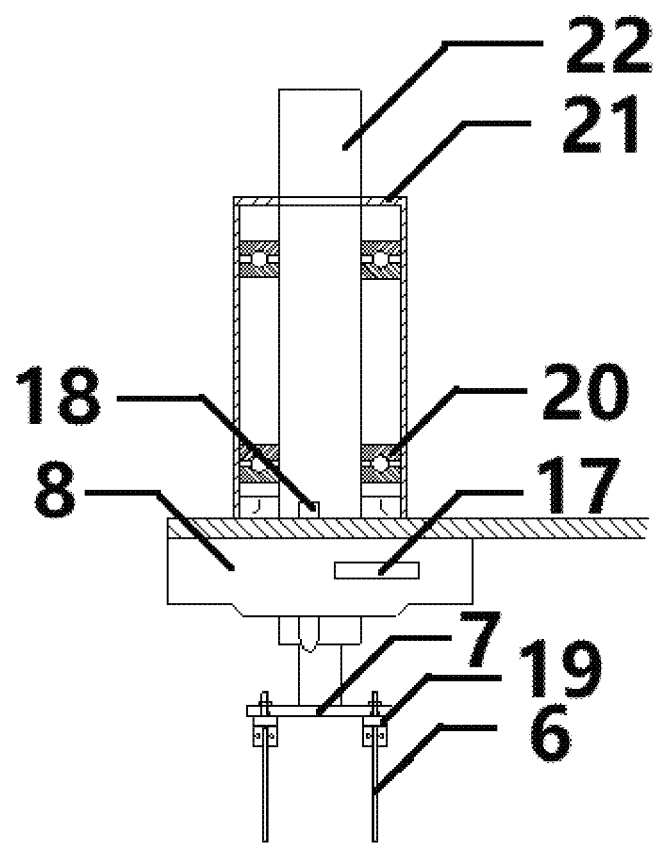
FIG. 5 is a schematic view of a stirring mechanism in the experimental device for corrosion of liquid metal.
Figure 6:
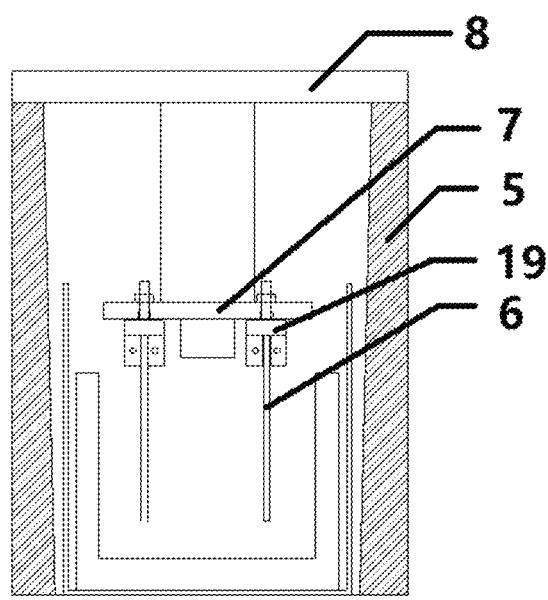
FIG. 6 is a schematic view of a heating furnace in the experimental device for corrosion of liquid metal.
Figure 9:
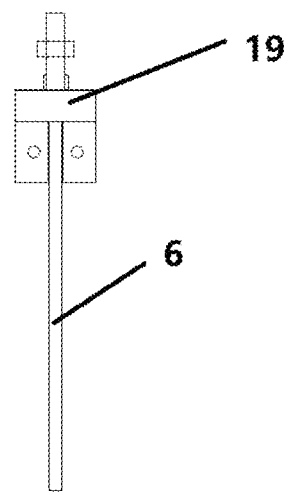
FIG. 9 is a schematic view of a clamp in the experimental device for corrosion of liquid metal.

Referring to FIG. 5, the stirring mechanism includes a sample rack 7, a stirring motor 22, a motor holder 21, a coupler 20 and a stirring shaft. The motor holder 21 is arranged on an upper side of the furnace lid 8. The stirring motor 22 is arranged on the motor holder 21 and connected to one end of the stirring shaft through the coupler 20, and the other end of the stirring shaft runs through the furnace lid 8 to be connected to the sample rack 7 on the lower side of the furnace lid 8. The sample rack 7 is fixed at the bottom end of the stirring shaft. A sample 6 is connected to the sample rack through a sample clamp 19. As shown in FIGS. 6 and 9, the rotation speed of the stirring shaft is adjustable among the following levels: 100 rpm, 500 rpm, 1000 rpm, 1500 rpm and 2000 rpm; and, the size of the sample 6 is 100×10×5 mm or Φ10×100 mm.

Figure 8:
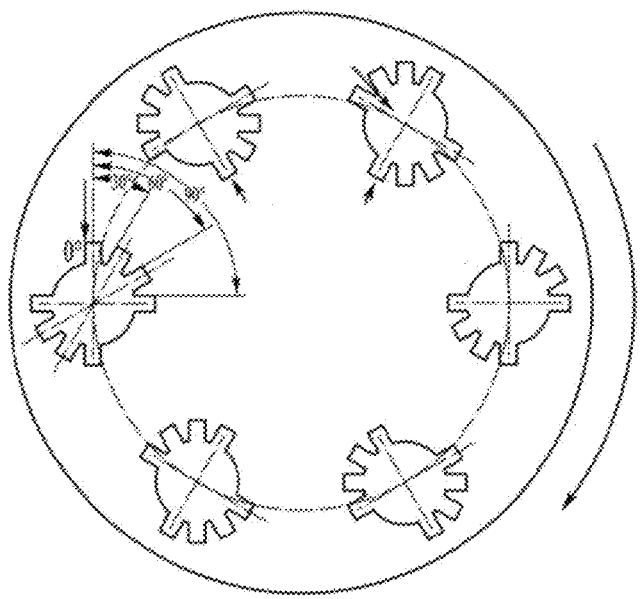
FIG. 8 is a schematic view of a sample rack in the experimental device for corrosion of liquid metal.

Referring to FIG. 8, three slots are formed at clamping positions of the sample rack 7.

The erosion to the sample from different angles can be realized.

The heating device includes a heating furnace 5, a crucible and an infrared temperature detector 18. The infrared temperature detector 18 is fixed on the furnace lid 8. It is convenient to monitor the temperature in the heating furnace 5. The crucible is of a cylindrical cavity. A lower end of the cavity is closed, while an upper end thereof is open. The cavity is disposed in the heating furnace 5. The cavity has a size of 150×150 mm.

The infrared temperature detector 18 is used for monitoring and displaying the temperature in the heating furnace 5 in real time. The furnace lid 8 can prevent liquid metal from splashing to hurt persons during the experiments.

The control system is of a three-layer system structure integrated with management and control. The first layer is a management and monitoring layer, the second layer is a control and execution layer, and the third layer is a device layer. The first layer and the second layer realize data communication through an industrial bus. A programmable controller, as a slave computer (the control and execution layer), processes on-site detection parameters, and controls a controlled object in real time. An industrial personal commuter, as a host computer (the management and monitoring layer), reads the data in the slave computer and dynamically displays and processes the data.

The control system converts a mechanical signal into an electrical signal through buttons on an operation board, and transmits the electrical signal to a control circuit through a signal line. The control circuit drives a device to operate. After the device operates, a sensing element converts a signal into an electrical signal and transmits the electrical signal to the control circuit. The control circuit encodes, interprets and transmits the electrical signal to a display for visualization.

To make the objectives, technical solutions and advantages of the embodiments of the present invention clearer, the technical solutions in the embodiments of the present invention will be described clearly and completely reference to the drawings in the embodiments of the present invention. Apparently, the described embodiments are some but not all of the embodiments of the present invention. Generally, the components in the embodiments of the present invention described and shown in the drawings can be arranged and designed in various different configurations. Therefore, the following detailed description of the embodiments of the present invention with reference to the accompanying drawings merely shows the selected embodiments of the present invention, rather than limiting the protection scope of the present invention. All other embodiments obtained by a person of ordinary skill in the art without paying any creative effort on the basis of the embodiments of the present invention shall fall into the protection scope of the present invention.

The experimental device of the present invention is operated by the following specific experimental operation steps.

1. The hand wheel is turned to lift the sample plate up to a specified position.

2. The platform of the furnace lid connected with the rotating shaft is rotated by 90° through the push-pull handle.

3. The clamp, on which the sample is clamped, is fixed on the sample chuck.

4. The crucible and the zinc ingot to be melted are placed in the heating furnace.

5. The power supply is turned on so that the power indicator lights.

6. An emergency stop state button is pressed down, and the machine enters an operable state.

7. The spare movable furnace lid for specific heating and heat preservation is put on the heating furnace.

8. Heating parameters are set, and the heating furnace is activated.

9. After the liquid zinc is completely melted, heat preservation is performed for 10 min, and the spare furnace lid for heat preservation is removed.

10. The furnace lid connected with the rotating shaft is moved to be axially symmetrical with the crucible by the push-pull handle.

11. The furnace lid is lifted down to a specified position by the hand wheel.

12. Parameters are set for an experiment, according to the experimental requirements.

13. At the end of the experiment, the machine is in an emergency stop state, and the sample plate is lifted up to a specified position by the hand wheel.

14. After the residual liquid zinc on the clamp is scraped by a steel bar, the platform of the furnace lid is rotated by 90°, and the clamp is disassembled.

15. The crucible containing liquid zinc is taken out from the heating device, and placed on a refractory brick besides the test bench.

16. The furnace lid is returned to the original position by the push-pull handle, the furnace lid is lifted down to the specified position by the hand wheel, and the temperature in the furnace is reduced slowly.

17. The power supply is turned off.

After the sample 6 is fixed on the sample rack 7, the sample 6 is put in the crucible in the heating furnace 5 through the lifting and rotating device 30. After parameters such as temperature, speed and whether to vibrate are set by the control system, the heating furnace 5 heats to a corresponding temperature, the stirring mechanism starts to operate, and the vibration platform 4 operates or stays in a standby state according to the set parameters. By adjusting the rotation speed of the stirring motor 22, the stirring mechanism keeps the linear velocity of the sample 6 correspondingly at high, medium and low levels, so as to simulate erosion in an actual working condition during the stirring process.

During comparison tests, six samples 6 with different performances can be simultaneously clamped on the sample rack 7. It is unnecessary to conduct a same test repeatedly for different samples. Therefore, the environmental errors can be minimized.

Figure 10:
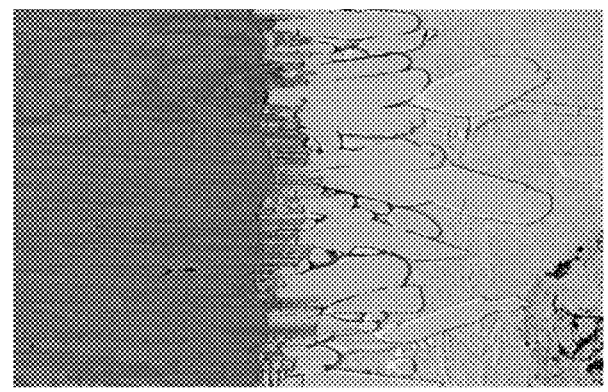
FIG. 10 is a diagram of erosive corrosion morphology without micro-oscillation cavitation corrosion, where (a) shows erosive corrosion morphology at a low speed and (b) shows erosive corrosion morphology at a high speed.
Figure 10:
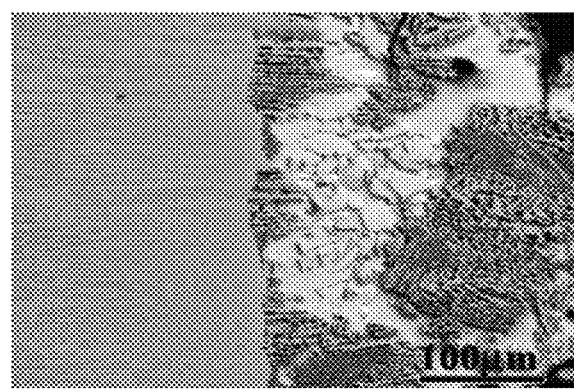

Referring to FIG. 10, FIG. 10(*b*) shows a metallographic micrograph of erosive corrosion at a high flow rate. It can be obviously observed that the corrosion reaction is more violent and the corrosion-resistantFe2B skeleton is thoroughly broken. Consequently, the corrosion of the matrix metal by liquid zinc cannot be shielded effectively. This cannot be observed for Fe—B alloys during the erosive corrosion of liquid zinc at a low flow rate.

Figure 11:
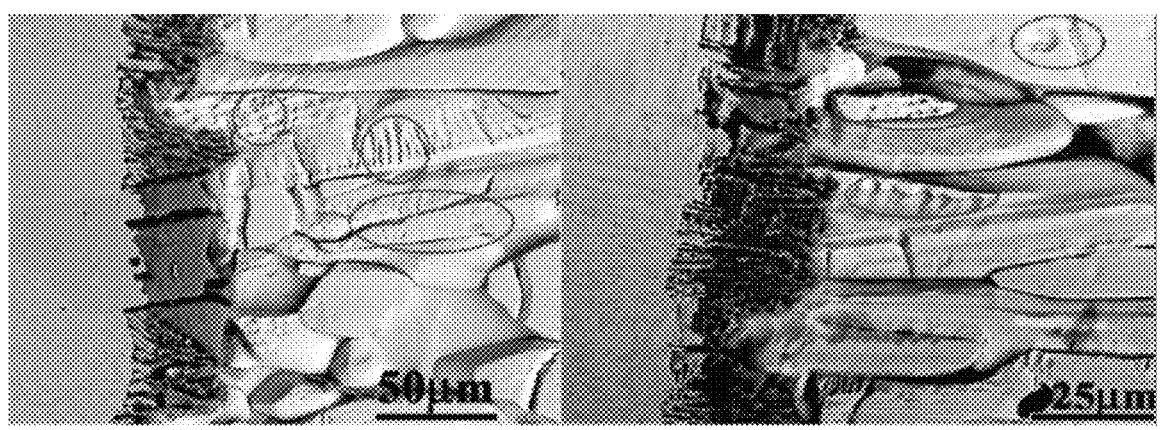
FIG. 11 is a diagram of erosive corrosion morphology at a low speed with micro-oscillation, where (a) shows 50 μm and (b) shows 25 μm.

Referring to FIG. 11, small pits in the circled area are erosion pits, while the corrosion product area in FIG. 10(*a*) is smooth without erosion pits.

The foregoing description is merely for describing the technical concept of the present invention, rather than limiting the protection scope of the present invention. Any alteration made based on the technical solutions without departing from the technical concept of the present invention shall fall into the protection scope defined by the claims of the present invention.

What is claimed is:

1. An experimental device for cavitation corrosion of liquid metal, comprising
    a stand (1), and
    a vibration device and a lifting and rotating device separately arranged on the stand (1), wherein a heating device for experimental use is arranged on the vibration device;
    the heating device comprises a heating furnace (5) arranged on the vibration device, and a silicon nitride crucible used for receiving a sample (6) is arranged inside the heating furnace (5); a furnace lid (8) with a sealing ring is arranged above the heating device; a stirring mechanism is arranged on the furnace lid (8); the stirring mechanism is connected to a chuck below the furnace lid (8); a clamp (19) is connected below the chuck, and the clamp (19) is connected to the sample (6); the furnace lid (8) is connected to the lifting and rotating device; the lifting and rotating device; controls the furnace lid (8) to rotate in a plane where the furnace lid is located;
    the lifting and rotating device, the stirring mechanism, the heating device and the vibration device are connected to a control system, respectively; and, a corrosion experiment is carried out by adjusting a temperature of the heating device;
    the lifting and rotating device comprises the guide pillar (9), one end of which is connected to the stand (1) through a guide pillar stand (10) while the other end of which is connected to the furnace lid (8) through a guide sleeve (12); a speed reducer holder (14) is arranged an extended end of the guide pillar (9); a speed reducer (6) is arranged on the speed reducer holder (14); and, the speed reducer (16) is connected to one end of a lead screw (11), and the other end of the lead screw (11) runs through a nut (13) on the furnace lid (8); the furnace lid (8) is controlled to lift up or down through the lead screw (11) and the nut (13);
    the stirring mechanism comprises a stirring motor (22) and a sample rack (7); the stirring motor (22) is connected to one end of a stirring shaft through a coupler (20); the other end of the stirring shaft runs through the furnace lid (8) to be connected to the sample rack (7); and, the sample (6) is arranged on the sample rack (7) through the clamp (19); and
    the vibration device comprises a vibration platform (4); the vibration platform (4) is arranged on the stand (1); a vibrator (2) is arranged below the vibration platform (4); and, the heating furnace (5) of the heating device is arranged on the vibration platform (4).

2. The experimental device according to claim 1, wherein the crucible is of a cylindrical cavity structure; and, a lower end of the cavity is closed, and a sealed end cover with a central circular hole is provided at an upper end thereof.

3. The experimental device according to claim 1, wherein an infrared temperature detector (18) connected to the control system is arranged on the furnace lid (8).

4. The experimental device according to claim 1, wherein the speed reducer (16) is connected to the control system, and the speed reducer (16) is connected with a hand wheel (15).

5. The experimental device according to claim 1, wherein a motor holder (21) is arranged on an upper side of the furnace lid (8); the stirring motor (22) is arranged on the motor holder (21); the sample rack (7) is arranged on a lower side of the furnace lid (8); and, three slots are formed at clamping positions of the sample rack (7).

6. The experimental device according to claim 1, wherein an air damper (3) is arranged between the vibration platform (4) and the stand (1).

\* \* \* \* \*